United States Patent [19]

Trocciola et al.

[11] Patent Number: 4,760,713
[45] Date of Patent: Aug. 2, 1988

[54] MULTIPLE HEAT SINK COOLING SYSTEM FOR A BURST POWER FUEL CELL

[75] Inventors: John C. Trocciola, Glastonbury; Donald R. McVay, Simsbury, both of Conn.

[73] Assignee: United Technologies Corporation, Hartford, Conn.

[21] Appl. No.: 931,593

[22] Filed: Nov. 17, 1986

[51] Int. Cl.⁴ .............................................. F25D 17/02
[52] U.S. Cl. .................. 62/434; 165/104.17; 429/20
[58] Field of Search ............... 62/59, 332, 330, 434; 165/104.17; 244/158 R; 429/20

[56] References Cited

U.S. PATENT DOCUMENTS

| | | | |
|---|---|---|---|
| 3,253,423 | 5/1966 | Sonnabend | 62/239 |
| 3,466,199 | 9/1969 | Gosmand | 136/86 |
| 3,672,183 | 6/1972 | Bernstein | 62/59 |
| 3,906,742 | 9/1975 | Newton | 62/332 |
| 4,044,568 | 8/1977 | Hagen | 62/59 |
| 4,099,557 | 7/1978 | Bricard et al. | 62/59 |
| 4,283,925 | 8/1981 | Wildfeuer | 62/332 |
| 4,446,910 | 5/1984 | Miller et al. | 62/59 |

Primary Examiner—Ronald C. Capossela
Attorney, Agent, or Firm—William J. Sapone

[57] ABSTRACT

Spaced based burst power fuel cells generate large thermal loads in very short time periods. In order to avoid external venting or the use of heavy radiators in space vehicles, such fuel cells must include onboard closed-loop cooling systems. Utilizing multiple heat sinks containing subcooled ice as a cooling medium, sequentially contactable with a coolant that passes through the fuel cell, provides a safe, highly efficient and low weight heat absorption capability.

8 Claims, 2 Drawing Sheets

MULTIPLE HEAT SINK COOLING SYSTEM FOR A BURST POWER FUEL CELL

CROSS REFERENCE TO RELATED APPLICATIONS

This application is related to copending application titled "Cooling System for a Burst Power Fuel Cell", filed on even date herewith, Ser. No. 931,593.

TECHNICAL FIELD

This invention relates to fuel cells and more particularly to closed-loop cooling systems for space based burst power fuel cells.

BACKGROUND ART

A fuel cell generally includes a stack of power generating elements which process reactants such as hydrogen and oxygen in an electro-chemical reaction which produces electrical energy. The reaction is exothermic, generating heat as well as by-product water. The heat of reaction must be continuously removed in order to prevent the cell temperature from rising above the optimum temperature for system efficiency.

Burst power fuel cells are devices which release substantial amounts of energy in very short time periods, on the order of seconds to minutes, in contrast to the much longer periods provided by non-burst power fuel cell systems. Such a rapid release in energy requires a complimentary rapid heat absorbing system in order to maintain the cell at its optimum operating temperature during the discharge cycle. Such burst power fuel cells have particular application in a number of emerging space missions which will require space based, electrically powered devices capable of providing instantaneous power bursts. Such a utilization places special limitations in terms of weight and complexity on the choice of a cooling system.

In U.S. Pat. No. 3,253,423, a cryogenic cooling system for space vehicles is disclosed which utilizes solid hydrogen as a cooling agent. Besides the hazards and complexity involved in loading such a system, there is a particular problem with venting the apparatus to space, with such venting causing platform instabilities. In addition, such vented gases can detrimentally affect platform sensors and impair or interrupt any beams or signals the device may be emitting or receiving from ground based or spaced based sources. The use of a radiator to cool the system, shown in FIG. 1 of the above-referenced patent, results in a system which is vulnerable to damage by meteroids or other debris. In addition, such a radiator is quite heavy, comprising a significant portion of the system weight and thereby adding a substantial fuel penalty on launch.

In U.S. Pat. No. 3,466,199, an isothermal assembly is disclosed for insulating a device from extreme cold by encasing it in ice. This provides a constant 0° C. temperature to the insulated device. While useful in insulating a passive device from extremely cold temperatures, it would not provide temperature control of an active heat generating device.

Generally, ground based fuel cells utilize double-loop cooling systems which require pumps, heat exchangers and complex piping (see FIG. 1). While providing safe and efficient cooling for ground base fuel cells, limitations in terms of weight and space preclude the adaptation of such cumbersome systems to space based fuel cells. Consequently, what is needed in the art is a cooling system adaptable to space based burst power fuel cells which conforms to the severe restrictions in terms of weight, space and emissions.

DISCLOSURE OF INVENTION

It is an object of the present invention to provide a closed-loop heat absorbing system that does not require external radiators or involve external venting of gases, vapors or liquids.

It is a further object of the present invention to provide a closed-loop heat absorbing system that is capable of absorbing large quantities of energy in short periods while minimizing space and weight requirements.

It is a further object of the present invention to provide a closed-loop cooling system which is leak tolerant.

These and other objects of the present invention are achieved by utilizing a multiple heat sink cooling system adapted for space based active heat generating devices. The cooling system includes a coolant, means for containing the coolant, a plurality of frozen medium containing heat sinks in mutual fluid communication with the device, means for directing the coolant through the fuel cell to a first heat sink, wherein the coolant is contacted with the frozen medium such that a desired coolant temperature is achieved, means for directing this cooled coolant through the device to a second heat sink, and means for controlling the sequential progression of flow through the device until all the frozen medium contained in the heat sinks is consumed. In particular, a burst power fuel cell is cooled by the progressive consumption of ice contained in a multiple heat sink cooling system. Utilizing ice as the frozen medium, stored at minus 127° F. and heated to 250° F., allows absorption of 385 Btus of waste heat per pound of water, with direct contact between the coolant (water) and the ice eliminating the need for bulky heat exchange equipment. By providing enough heat sinks to absorb the heat released in a burst power cycle, no radiators are needed nor is external venting required and any auxiliary equipment is kept at a minimum.

BEST MODE FOR CARRYING OUT THE INVENTION

Figure 1:
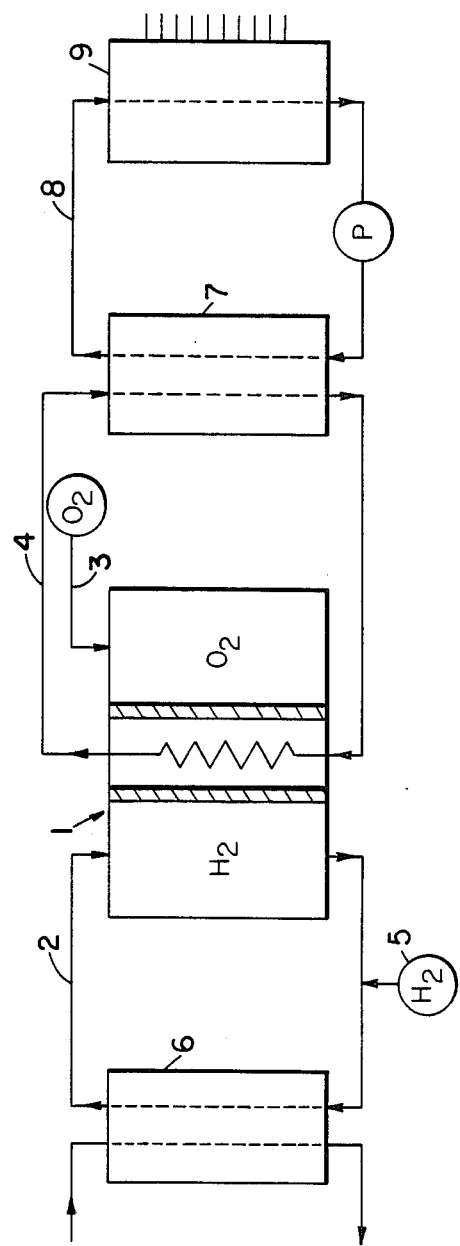
FIG. 1 illustrates a prior art fuel cell cooling system.

Referring to FIG. 1, a prior art fuel cell cooling system is shown. The fuel cell 1 has an anode stream 2, a cathode stream 3 and a recirculating cooling stream 4, with the anode stream 2 generally comprising a mixture of hydrogen and water vapor which is recirculated through the fuel cell. Fresh hydrogen is added to the recirculating anode stream from a storage tank 5 prior to passage of the anode stream through a first heat exchanger 6, wherein the anode stream is cooled and excess water vapor condensed. The cathode stream 3, which may also be a recirculating stream, comprises oxygen which is fed to the fuel cell. For examplary purposes, the oxygen is shown to be completely consumed within the fuel cell and no exhaust stream is generated. The coolant stream 4 circulates through the fuel cell 1 and removes heat which is then transferred through a second heat exchanger 7 into an auxiliary coolant stream 8, which circulates through a radiator 9 which may utilize either outer space or the atmosphere as a heat sink. Two loops are required to provide controlled cooling of the fuel cell 1. Generally, the primary stream 4 utilizes fluorocarbon liquids as the circulating medium with water utilized in the auxiliary cooling stream 8.

Figure 2:
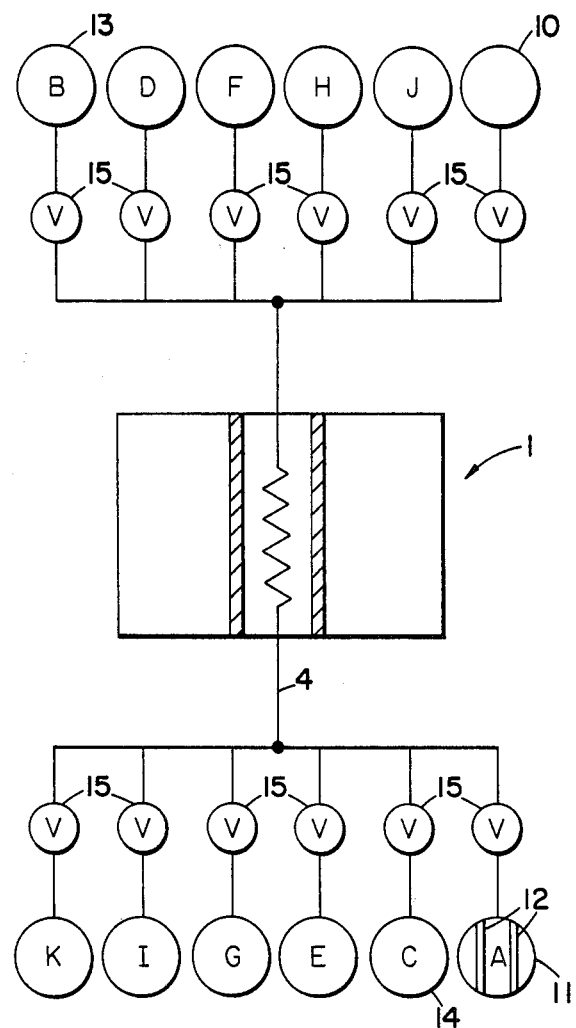
FIG. 2 illustrates the fuel cell cooling system of the present invention, utilizing multiple heat sinks containing ice to cool the fuel cell.

Referring to FIG. 2, the fuel cell cooling system of the present invention is shown, which utilizes multiple heat sinks in sequential progressive operation to cool the fuel cell. The fuel cell 1 still includes the coolant stream 4, with the coolant being, for exemplary purposes, water. However, the coolant stream does not recirculate, but rather flows first in one direction and then reverses. While such a reversible flow system is shown, it will be understood by those skilled in the art that the heat sinks may be so valved as to provide circulatory flow through the fuel cell. The stream 4 passes through the fuel cell from a storage tank 10 upon actuation and heating of the fuel cell. The coolant passes through the fuel cell to a first heat sink 11 which contains the frozen medium, solid ice 12. The ice may be subcooled, preferably to $-127°$ F., in order to optimize the heat absorption capability of the heat sink. It is expected that in a typical cooling cycle all the ice will be heated from approximately $-127°$ F. to $32°$ F., and melted. The water may be additionally heated depending on the heat generation within the fuel cell, coolant quantity and time to cycle reversal. The total heat capacity may, therefore, be upwards of 385 Btus per pound of water. The final temperature of the heat sink is a function of the desired fuel cell operating temperature, heat transfer efficiency and desired approach temperature. Higher operating temperature fuel cells will result in a higher final temperature for the heat sink.

After the first heat sink has been heated to the desired flow reversal temperature, the flow is reversed and the water from the first heat sink is directed through the fuel cell to a second heat sink 13 which also contains ice. Again, heat is absorbed by the ice until melting and heating occurs, at which time the flow is again reversed and the liquid passed through the fuel cell to a third heat sink 14. For ease of illustration, the individual heat sinks have been assigned letters, from A to K with the coolant flow oroposed to flow progressively from heat sink A to B to C, etc.

Referring again to FIG. 2, switching valves 15 are shown before each heat sink for isolation and switching purposes, with the valves allowing or preventing coolant flow to the heat sinks. These valves may be controlled by a computer system or by any other adaptable control systems which can provide the proper valve sequencing in response to fuel cell temperature.

It will be understood by those skilled in the art that such a system optimizes the utilization of ice as a cooling medium while minimizing weight. As will be evident, the number of heat sinks required may be tailored to the size and heat load of the system, thereby offering broad applicability. For a high heat load, additional heat sinks can be included while utilizing a single control system. This modular arrangement optimizes utilization over a broad range of heat generating devices while allowing customizing to critical weight requirements.

While a coolant/water and frozen medium/ice system is discussed, it will be understood by those skilled in the art that the frozen medium may be any coolant compatible composition which displays desirable heat absorption capabilities. A water/ice system is preferred, due to the advantageous thermodynamic properties of water/ice, its nontoxicity, and fuel cell gas stream compatibility.

While this invention has been described in relation to cooling systems for burst power fuel cells, it will be understood bv those skilled in the art that other space based active heat generating devices may benefit from the present invention. In addition, it will be understood by those skilled in the art that the quantities, times and temperatures discussed are exemplary and that the particular parametric requirements may vary with each application, and that such variations do not depart from the scope of the present invention. For example, while an fuel cell temperature of $250°$ F. was discussed, it will be understood by those skilled in the art that optimum fuel cell temperatures may range from $200-400°$ F.

Having thus described the invention, what is claimed is:

1. A multiple heat sink cooling system for a space based heat generating device characterized by: a coolant; means for containing said coolant; a plurality of heat sinks, each heat sink having a frozen medium disposed therein and in mutual fluid communication with said device; means for directing said coolant from said containment means, through said device to a first heat sink, wherein said coolant is contacted with said frozen medium disposed therein, such that a desired coolant stream temperature is achieved; means for directing said cooled coolant from said first heat sink through said heat generating device to a second heat sink; and, means for controlling the sequential progression of coolant flow through said device, such that cooling is effected by the progressive consumption of said frozen medium disposed within the plurality of heat sinks.

2. The cooling system of claim 1 wherein said directing means comprise a plurality of switching valves, each valve disoosed adjacent to a corresponding heat sink for allowing or preventing flow of coolant to said heat sink; and, wherein said controlling means comprise a computing system for sequentially operating the switching valves.

3. The cooling system of claim 1 wherein said coolant is water and said frozen medium is subcooled ice.

4. The cooling system of claim 3 wherein said subcooled ice is at a temperature of $-127°$ F.

5. A multiple heat sink cooling system for a space based burst power fuel cell comprising: a coolant, means for containing said coolant; a plurality of heat sinks, each heat sink having a frozen medium disposed therein and in mutual fluid communication with said fuel cell; means for directing said coolant from said containment means, through said fuel cell to a first heat sink, wherein said coolant is contacted with said frozen medium disposed therein such that a desired coolant stream temperature is achieved; means for directing said cooled coolant through said fuel cell to a second heat sink; and means for controlling the sequential progression of coolant flow through said fuel cell such that cooling is effected by the progressive consumption of said frozen medium disposed within the plurality of heat sinks.

6. The cooling system of claim 5 wherein said directing means comprise a plurality of switching valves, each valve disposed adjacent to a corresponding heat sink for allowing or preventing flow of coolant to said heat sink, and, wherein said controlling means comprise a computing system for sequentially operating the switching valves.

7. The cooling system of claim 5 wherein said coolant is water and said frozen medium is subcooled ice.

8. The cooling system of claim 7 wherein said ice is at a temperature of $-127°$ F.

* * * * *